United States Patent
Wang (10) Patent No.: US 6,263,086 B1
(45) Date of Patent: Jul. 17, 2001

(54) AUTOMATIC DETECTION AND RETRIEVAL OF EMBEDDED INVISIBLE DIGITAL WATERMARKS FROM HALFTONE IMAGES

(75) Inventor: Shen-ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/060,469

(22) Filed: Apr. 15, 1998

(51) Int. Cl.[7] .............................. G06K 9/00; G06K 9/64; G09C 3/00
(52) U.S. Cl. .............................. 382/100; 382/278; 380/54
(58) Field of Search ..................... 382/100, 232, 382/278, 295; 380/54, 210

(56) References Cited

U.S. PATENT DOCUMENTS

| | | | |
|---|---|---|---|
| 4,194,221 | * 3/1980 | Stoffel | 358/283 |
| 4,509,150 | * 4/1985 | Davis | 367/76 |
| 4,745,633 | * 5/1988 | Waksman et al. | 382/56 |
| 4,791,671 | * 12/1988 | Willems | 381/49 |
| 5,339,172 | * 8/1994 | Robinson | 358/462 |
| 5,694,102 | * 12/1997 | Hecht | 235/456 |
| 5,710,636 | 1/1998 | Curry . | |
| 5,710,834 | 1/1998 | Rhoads . | |
| 5,734,752 | 3/1998 | Knox . | |
| 5,835,639 | * 11/1998 | Honsinger et al. | 382/278 |
| 5,859,920 | * 1/1999 | Daly et al. | 382/115 |
| 5,893,067 | * 4/1999 | Bender et al. | 704/502 |
| 5,905,800 | * 5/1999 | Moskowitz et al. | 380/28 |
| 5,930,369 | * 7/1999 | Cox et al. | 380/54 |

FOREIGN PATENT DOCUMENTS

| | | | |
|---|---|---|---|
| 0777197A2 | * 6/1991 | (EP) | G06T/1/00 |
| 0 493 053 A2 | 12/1991 | (EP) . | |
| 0901282A2 | * 3/1999 | (EP) | H04N/5/913 |
| WO 96/25005 | 8/1996 | (WO) . | |
| WO 98/11492 | * 3/1998 | (WO) | G06F/17/30 |

OTHER PUBLICATIONS

Bender et al. (Bender), "Techniques for Hiding Data", IBM Systems Journal, vol. 35, Nos. 3&4, 1996.*
Knox and Wang, Digital watermarks using stochastic screens, Proc. SPIE vol. 3018, Apr., 1997, pp. 316–322.*
Tirkel, A.Z. et al., Image watermarking–a spead spectrum application, IEEE synposium on Spread Spectrum Techniques and Applications, Sep. 1996, vol. 2, pp. 785–789.*
Fieberg, Auto– and Crosscorrelation properties for extended m–sequences and related sequences, IEEE synposium on Spread Spectrum Techniques and Applications, Jul. 1994, vol. 2, pp. 406–410.*
Tanaka et al., Embedding secret information into dithered Multi–level image, IEEE Military Communications Conference, Oct. 1990, pp. 0216–0220.*
Tanaka et al., New integrated coding schemes for computer–aided facsimile, Proc. First Int. Conf. on Systems Integration, Apr., 1990, pp. 275–281.*
Tanaka et al., Embedding the Attribute information into a dithered image, Systems and Computers in Japan, vol. 21, No. 7, 1990, pp. 43–56.*

* cited by examiner

*Primary Examiner*—Amelia M. Au
*Assistant Examiner*—Martin Miller
(74) *Attorney, Agent, or Firm*—Oliff & Berridge, PLC (57) ABSTRACT

A system for automatic detection and retrieval of embedded invisible digital watermarks retrieves digital watermarks from halftone images. Specifically, by supplying an image to the system, through a process of autocorrelation and shifting, the embedded invisible watermark becomes visible. The process includes scarning or supplying an image to the system, calculating the global autocorrelation of the image, selecting a moving window size, conducting a piecewise localized autocorrelation for each window-sized portion of the image, retrieving the embedded, initially invisible, watermarks, normalizing the resultant image for visualization and displaying the resultant image with the now visible retrieved embedded digital watermarks.

33 Claims, 12 Drawing Sheets

AUTOMATIC DETECTION AND RETRIEVAL OF EMBEDDED INVISIBLE DIGITAL WATERMARKS FROM HALFTONE IMAGES

BACKGROUND OF THE INVENTION

1. Field of Invention

This invention is directed to a system and method for automatically detecting invisible digital watermarks embedded in halftone images, or other images that use microstructures to simulate continuous tone color or grayscale images.

2. Description of Related Art

Methods for protecting copyrightable works have evolved from a simple designation below the work to highly complex methods for embedding watermarks in the work. Watermarking can take two basic forms: visible and invisible. Visible watermarks are the commonly-seen copyright logos or symbols that are generally affixed to the work before sales or distribution. Especially in the case of images, the presence of the watermark is very visible, and is generally difficult to remove without damaging the image. Generally speaking, visible watermarks do not harm the image, even though the watermarks may detract form the overall esthetics of the image. Furthermore, the visible watermark is a potential target for fraud. Since a fraudulent copier is actually placed on notice regarding the presence of the watermark, it is possible to attempt to remove the visible watermark from the image.

Invisible watermarks are far more creative and can encompass the standard and commonly used copyright logos or symbols, as well as company logos, serial numbers, origin identification marks, and/or encrypted data. These invisible watermarks are embedded into the work in a way which is not generally discernible without the aid of a visualization device such as a key or computer. Theoretically, these embedded images can be retrieved from the work at any time in the work's history or from any other form or embodiment into which the work may have been translated. This allows the owner to track the work and clearly establish ownership rights when those right are in dispute. Furthermore, since the embedded watermark image is essentially invisible to the unaided eye, the likelihood of tampering with or removal of the watermark is reduced.

SUMMARY OF THE INVENTION

This invention provides a system and method for embedding and retrieving digital watermarks that overcomes the problems associated with recovering these marks from non-original images.

This invention further provides a system and method that allows previously unretrievable embedded invisible watermarks to be recovered from works that have been converted from a digital format to a printed copy, such as a print, or from a reproduction made, for example, on a photocopier.

This invention also provides a system and method that uses localized autocorrelation to estimate the exact amount of the separation between two adjacent correlated halftone patterns that when properly combined produce a visible watermark. Localized autocorrelation of the two adjacent correlated halftone patterns can reduce the effect of distortion and nonuniformity to a minimum. Additionally, global scaling and/or rotation can be treated as individual local shifting and does not need global correction. Thus, localized autocorrelation generates a clearer result.

This invention additionally provides a system and method that uses a two-step autocorrelation process to extract or retrieve embedded digital watermarks from a printed or copied image.

Invisible watermark retrieval depends on the pixel-to-pixel comparison between a bitmap of a halftone image and the bitmap of the halftone image having a certain shift relative to itself. In some areas the bitmap and its shifted version are highly correlated, i.e., near identical, while in other areas they are uncorrelated or highly "conjugately" correlated, i.e., one bitmap is the inverse of the other bitmap. The pixel-to-pixel comparison between the original and shifted bitmaps can provide a contrast between the correlated areas and other areas. Therefore, the embedded, or hidden, watermark becomes visible.

However, retrieval of the original bitmaps from printed copies is not trivial, especially from high-resolution printed copies. Both printing and scanning processes introduce overlapping, distortion and nonuniformity, as well as noise, to the embedded image. The exact bitmap information in very dark regions of the image in the printed copy is difficult to recover. Even in the brighter regions of the image, where there is greater contrast, retrieving the digital watermark is expected to be successful only in a statistical sense. The spatial separation between the two adjacent correlated halftone patterns varies and the amount of shift is generally not an integer number of bitmap pixels on rescanned images. Accurately determining the spatial separation, or the location of a correlation peak, becomes the most critical requirement when detecting hidden watermarks.

Autocorrelation is most easily visualized by imagining two transparencies containing identical images. The two images are then overlayed so they are in perfect alignment. At this point, the maximum amount of light passes through the images. Autocorrelation with (0, 0) arguments refers to this perfect alignment, where there is zero shift between the two images and a maximum amount light of light passes through the images. The value of the autocorrelation with arguments other than (0, 0) can be visualized as one image being shifted relative to the other image, where the amount of light passing through the images is reduced. Usually, the reduction in transmitted light falls quickly near the (0, 0) position and the autocorrelation becomes approximately constant when its arguments, viewed as the relative shift between the two transparencies, are large. However, if the image contains spatially periodic structures, such as the halftone image generated by tiling a single halftone screen over the entire image, relative peaks of autocorrelation occur for certain arguments. These relative peaks may be visualized as the amount of light transmitted through the two transparencies for a certain relative shift The relative peak amount of transmitted light may not be as great as the primary, or absolute, peak amount of transmitted light that occurs when the images are perfectly aligned. However, this secondary relative peak is detectable. Therefore, if watermarks are embedded in a halftone image, i.e., in the periodic structure of the image, autocorrelation repeats itself to an extent when the periodic occurrences of the watermark are themselves aligned between the two images.

Therefore, by using a two-step autocorrelation process, the system and method of this invention enables recovery of invisible digital watermarks from printed copies.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
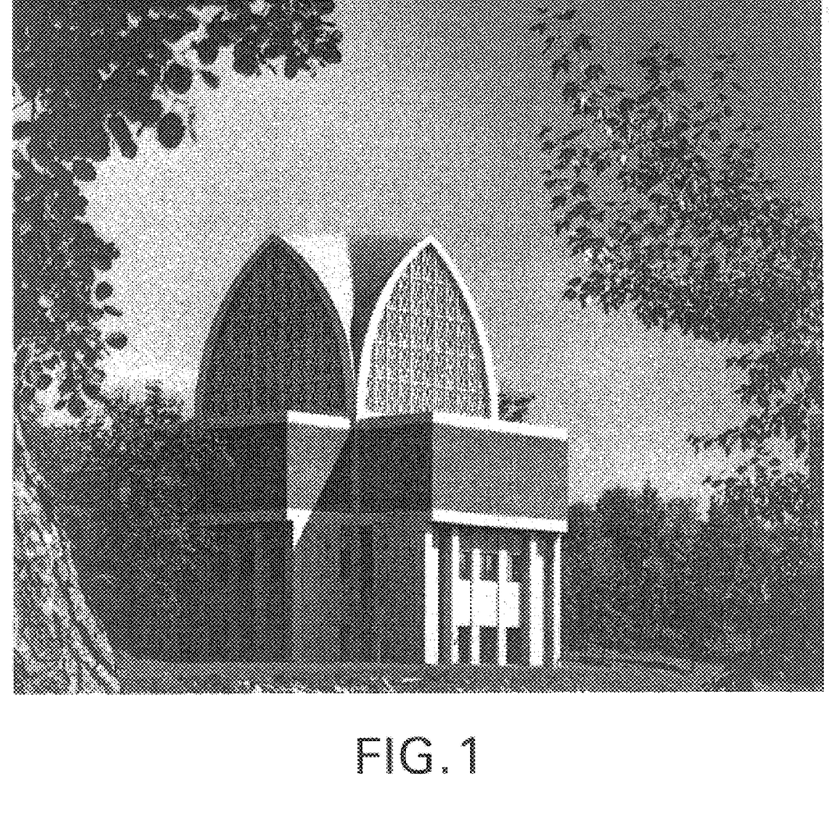
FIG. 1 is a halftone image containing an invisible or embedded digital watermark.
Figure 2:
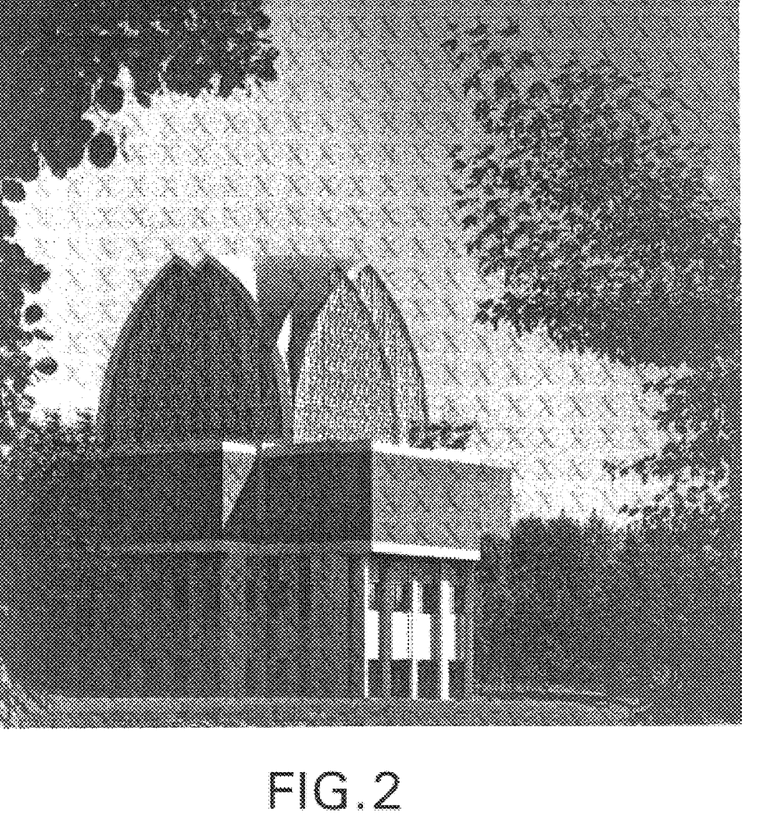
FIG. 2 shows the embedded watermark retrieved by using the method according to this invention.

FIG. 1 shows an image 100 containing a hidden, or embedded, digital watermark. FIG. 2 shows a processed image 100', formed by processing the image 100 according to the method of this invention, to retrieve or extract the embedded watermark 110. The image 100 was selected because the image 100 reflects one of the most difficult situations for watermark retrieval. Specifically, the image 100 shown in FIG. 1 is an image of a chapel, created by a 180×90 dpi stochastic halftone screen with an embedded invisible digital watermark, printed at 400 dpi on a black and white printer. The embedded digital watermark is an "X" logo. This particular stochastic screen is designed so that the left 90×90 pixel square is identical to the right 90×90 pixel square, except within the area specified by the shape of the X logo of the embedded watermark. Within the X logo, all corresponding pairs between the left and right squares are conjugates.

In the image 100' shown in FIG. 2, the presence and clarity of the embedded digital watermark 110 retrieved from the original watermark-encoded image 100 of FIG. 1 can be seen, presuming the image has remained in unaltered digital format since the watermark embedding process. Operating in the digital realm, if the watermark-embedded digital image 100 shown in FIG. 1 is copied, the original image and the copy can be digitally overlayed. The copy is then digitally shifted 90 pixels to the right relative to the original image. When the two images are then logically ANDed together, the embedded watermark 110 becomes clearly visible, as shown in the image 100' shown in FIG. 2.

Thus, by using the method and system of this invention, retrieving watermarks from images that have not been outside the digital realm since the embedding process is straightforward and produces clear results. However, retrieving the same watermarks after the image has been transferred to a printed copy is not trivial.

However, it should be appreciated that this image is not limited in any way to a printed image. The only requirement for retrieving an embedded digital watermark is that the image on which the retrieval operation is performed was once encoded with an embedded digital watermark. The system and method of this invention works equally well on images that have been printed and subsequently scanned, that have been previously converted into a digital image, or that have been maintained in electronic form.

Figure 3:
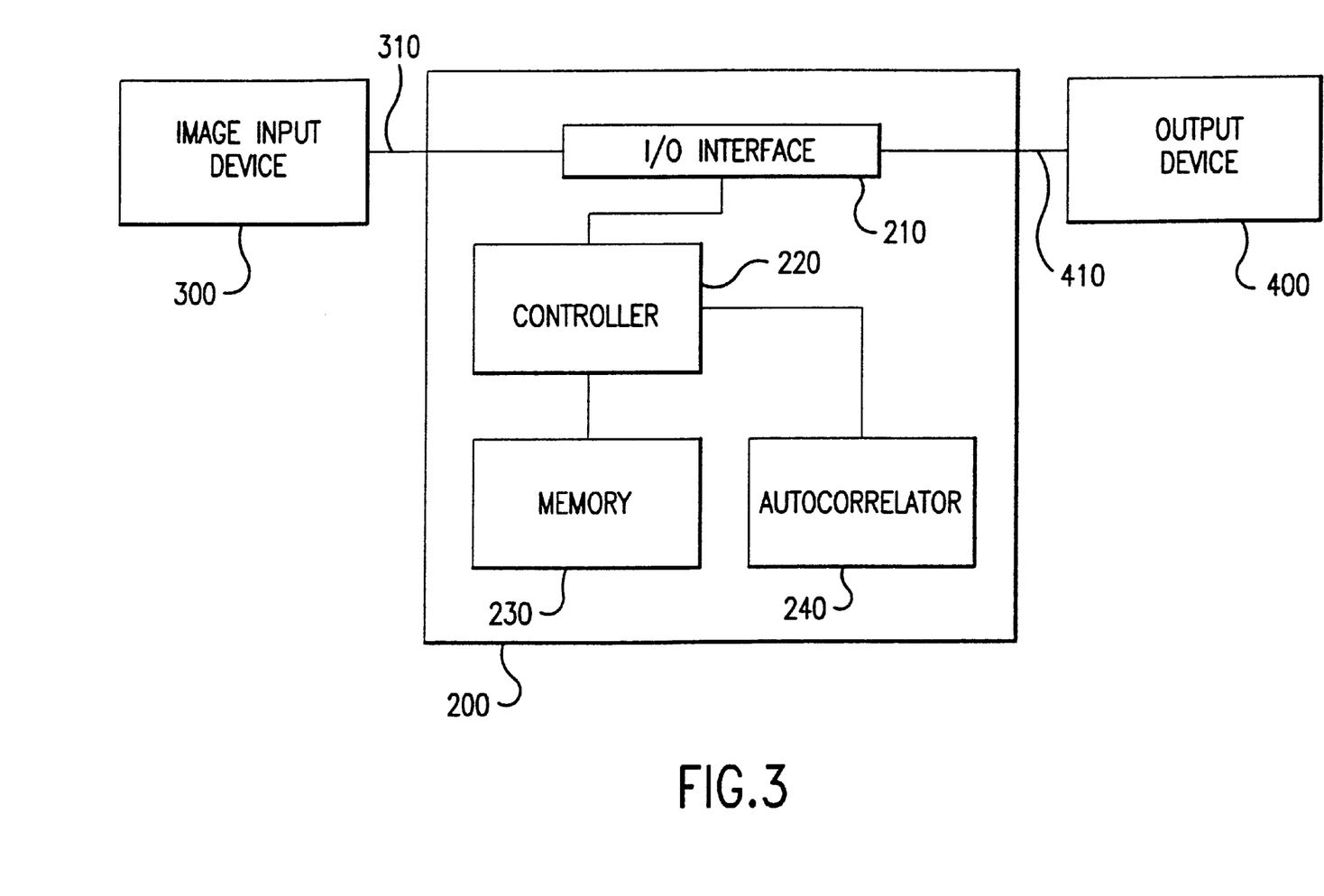
FIG. 3 is a functional block diagram of a watermark detection device according to this invention.

FIG. 3 shows a watermark extraction device 200 for extracting embedded digital watermarks from an image according to this invention. As shown in FIG. 3, an image containing an embedded digital watermark is input from an image input device 300 over a link 310 to the watermark extraction device 200. It should be appreciated that the image input device 300 can be any device that stores and/or generates an electronic version of the image.

Thus, the image can be a printed hardcopy version of the image, and the image input device 300 can be a scanner that scans and outputs an electronic version of the image over the link 310 to the watermark extraction device. Furthermore, the scanner 300 and the watermark extraction device 200 can be elements integrated into a digital photocopier.

Similarly, the image input device 300 can be a server or other node on a local area network, a wide area network, an intranet, the Internet or any other distributed network. In this case, the image is already stored on the network in electronic form. Finally, the link 310 can be a wired or wireless link to the scanner or other image conversion device or to the network that forms the image input device 300. Thus, the image input device 300 and the link 310 can be any known elements that are capable of supplying an electronic image to the watermark extractor device 200.

As discussed above, the system and method of this invention works equally well on images that have not been transferred to hardcopy. In this case, the image is already in digital format and the image is ready for processing by the watermark extraction device 200.

The watermark extraction device 200 includes an I/O interface 210, a controller 220, a memory 230 and an autocorrelator 240. An image is received from the image input device 300 via the link 310. The I/O interface 210 forwards the input image data received from the image input device, under the direction of the controller 220, to the memory 230. The autocorrelator 240 processes the image based on determined global and piecewise autocorrelation to retrieve the watermarks and form an image where the watermarks are visible from the input image. This resulting image is then output via the I/O interface 210 and a link 410 to an output device 400. It should be appreciated that the output device 400 can be any device that outputs or displays the resulting image data.

Figure 4:
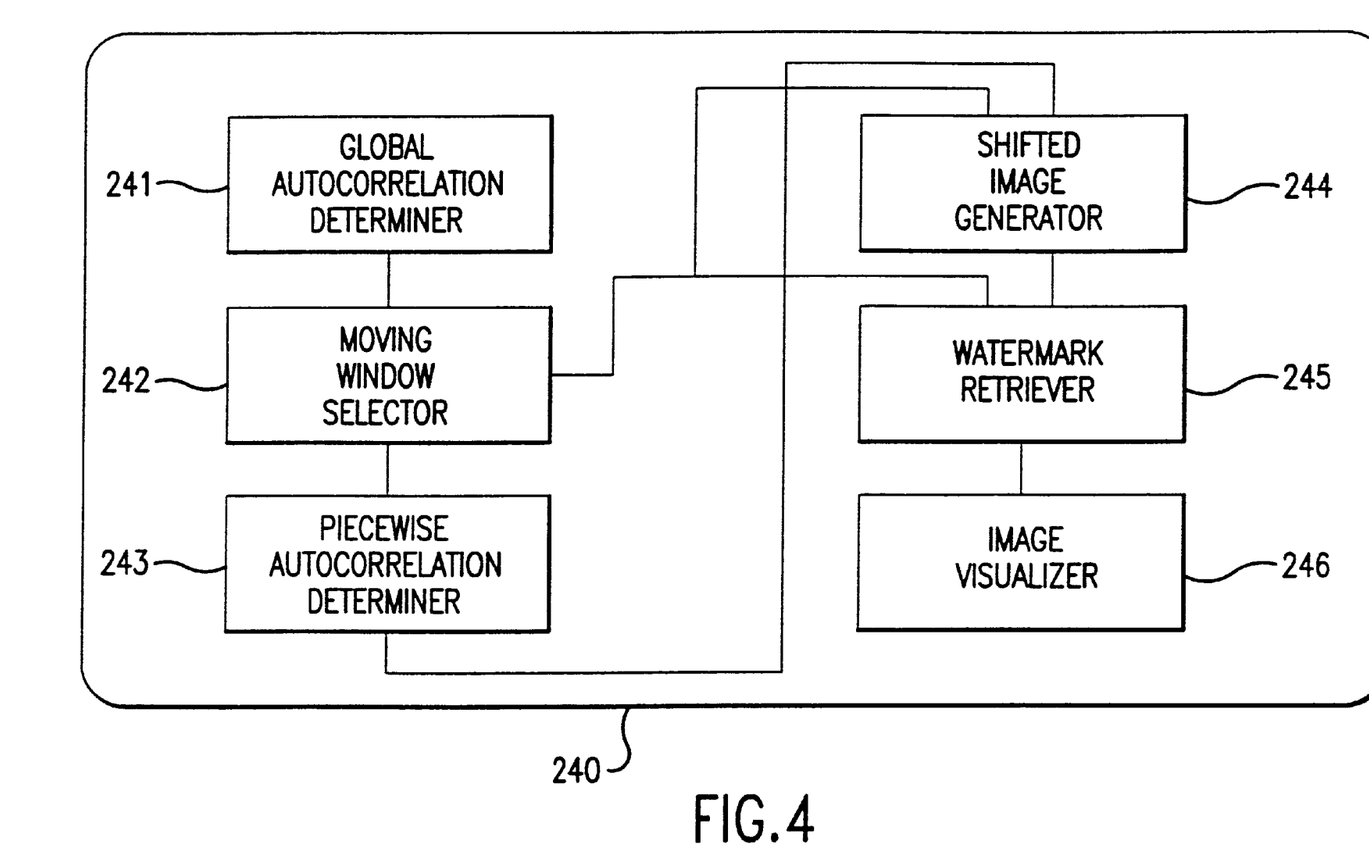
FIG. 4 is a functional block diagram showing the autocorrelator of FIG. 3 in greater detail.

As shown in greater detail in FIG. 4, the autocorrelator 240 functionally includes a global autocorrelation determiner 241, a moving window selector 242, a piecewise autocorrelation determiner 243, a shifted image generator 244, a watermark retriever 245 and an image normalizer 246. The global autocorrelator 241 inputs the input image from the memory 230 and outputs global correlation peaks to the moving window selector 242. The moving window selector 242 moves over the input image and outputs a plurality of portions of the input image, each portion corresponding to the size of the moving window and to a current position of the moving window. The piecewise autocorrelation determiner 243 inputs the plurality of portions and outputs a local autocorrelation for each portion. The shifted image generator 244 inputs the local autocorrelations and the plurality of portions and outputs a shifted image for each portion. The watermark retriever 245 inputs the plurality of portions and the corresponding shifted images and outputs a plurality of combined portions where the watermarks are visible. The image visualizer 246 combines the plurality of combined portions into an output image.

With the image data residing in the memory 230, the global autocorrelation determiner 241 determines a global autocorrelation for the input image by searching for peaks in the autocorrelation of the input image, and determines if the image is a halftone image. If the image is a halftone image, the global autocorrelation determiner 241 estimates the size and orientation of the halftone screen that was used for generating the halftone image. Next, the moving window selector 242 selects and moves a moving window over the image to select portions of the image. The piecewise autocorrelation determiner 243 then determines, for each portion of the image selected by the moving window selector, the localized autocorrelation of that selected portion of the input image. The shifted image generator 244 next generates, for each portion of the image selected by the moving window selector, a shifted image. The watermark retriever 245 then retrieves, for each portion of the image selected by the moving window selector, the embedded digital watermarks. The image visualizer 246 normalizes the resultant image for visualization. The resulting image is then stored in the memory 230.

Figure 5:
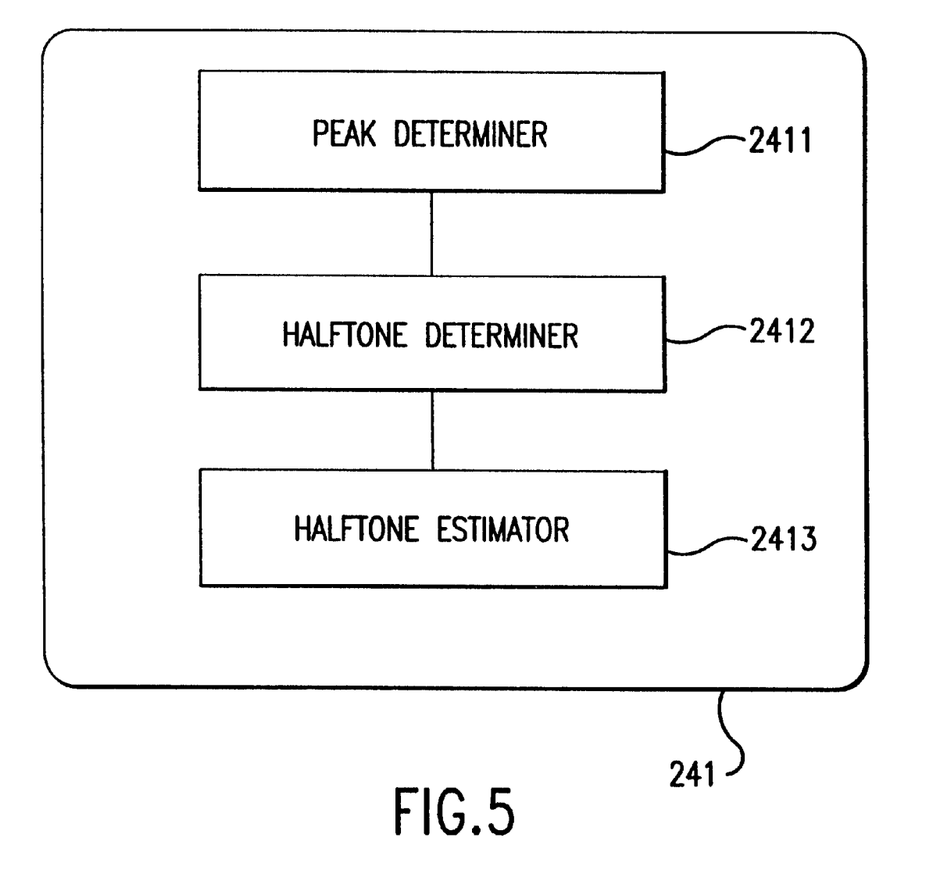
FIG. 5 is a functional block diagram outlining in greater detail the global autocorrelation determiner of FIG. 4.

FIG. 5 shows the global autocorrelation determiner 241 of FIG. 4 in greater detail. The global autocorrelator 241 includes a peak determiner 2411, a halftone determiner 2412 and a halftone estimator 2413. Global autocorrelation begins in the peak determiner 2411, which searches the image for correlation peaks. Upon detection of these peaks the halftone determiner 2412 determines if the image is a halftone. If the halftone determiner 2412 determines that the image is a halftone, the halftone estimator 2413 estimates a size and orientation of the halftone. If the halftone determiner determines that the image is not a halftone, the halftone determiner 2412 outputs a signal to the controller 220 to halt processing of the input image.

Figure 6:
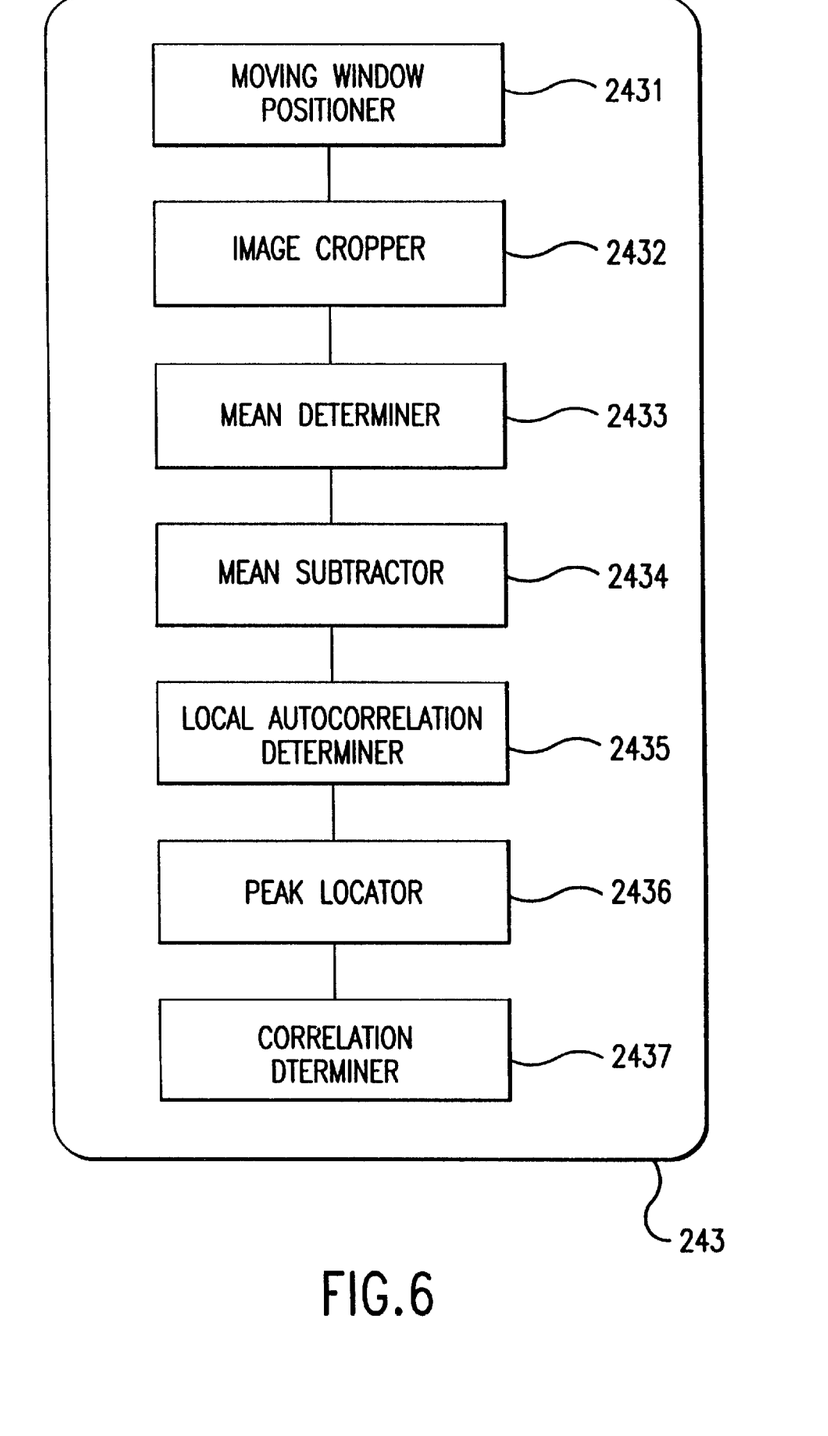
FIG. 6 is a functional block diagram outlining in greater detail the piecewise autocorrelation determiner of FIG. 4.

FIG. 6 shows the piecewise autocorrelation determiner 243 of FIG. 4 in greater detail. The piecewise autocorrelation determiner 243 includes a moving window positioner 2431, an image cropper 2432, a mean determiner 2433, a mean subtractor 2434, a local autocorrelation determiner 2435, a peak locator 2436, and a correlation determiner 2437. Once the moving window has been selected by the moving window selector 242, the piecewise autocorrelator determiner 243 begins by moving the selected window across the input image. As the moving window positioner 2431 moves the selected window across the image, for each new window position, the image cropper 2432 crops the image to the portion of the image within the moving window. Next, the mean determiner 2433 determines the mean of that portion of the image. Then, the mean subtractor 2434 subtracts the mean from that iportion of the image. Next, the local autocorrelation determiner 2435 determines a local autocorrelation of that portion of the image. Then, the peak locator 2436 locates a local peak for that portion of the image near a point estimated by the global autocorrelation determiner 241. Finally, the correlation determiner 2437 determines the local maximal correlation of that portion of the image.

The resulting image can be a printed or copied version of the input image, and the output device 400 can be a printer. Similarly, the output device 400 can be a monitor which is capable of displaying an electronic version of the resulting image for viewing. Furthermore, the scanner 300, the watermark extraction device 200 and the output device 400 can be elements integrated into a single device, such as a digital photocopier.

Similarly, the output device 400 can be a server or other node on a local area network, a wide area network, an intranet, the Internet or any other distributed network. In this case, the resulting image is transferred and stored on the network in electronic form. Finally, the link 410 can be a wired or wireless link to the output device 400 or any other image output or display device or to the network. Thus, the output device 400 and the link 410 can be any known elements that are capable of receiving and outputting or storing the resulting electronic image from the watermark extraction device 200.

Figure 7:
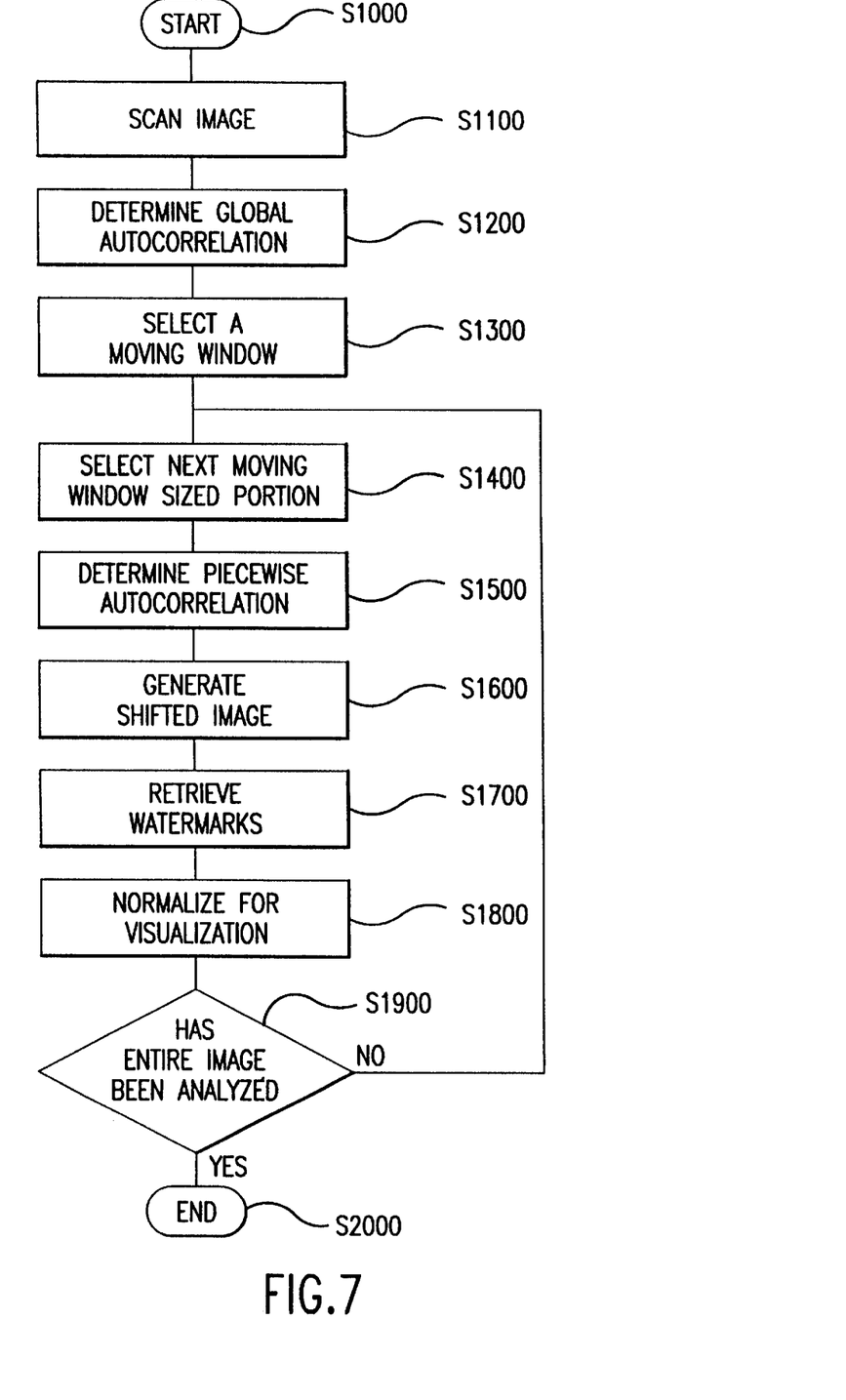
FIG. 7 is a flowchart outlining the watermark retrieval process according to this invention.

FIG. 7 outlines a method according to this invention for retrieving embedded watermarks from images that have been converted to a printed copy. Beginning in step S1000, control continues to step S1100, where the printed copy image is scanned. It should be appreciated that, if the image is already in electronic format, control jumps directly to step S1200.

In step S1200, the image is analyzed to determine if the image is a halftone image and to estimate a global autocorrelation for the image. Next, in step S1300, a moving window is selected. The size of the moving window is based on the estimation of the global autocorrelation analysis. Then, the image is further analyzed by iteratively applying the moving window over the entire image. At the beginning of each iteration, in step S1400, a next moving-window-sized portion of the image is selected. Then in step S1500, the piecewise localized autocorrelation for each selected, moving window-sized portion of the image is determined. Control then continues to step S1600.

In step S1600, based on the results of the localized autocorrelation determination, an estimate of the local peak is determined for each selected portion of the image. A shifted image will be generated for each selected portion of the image based on the peak value of the localized autocorrelation determined for that selected portion. Next, in step S1700, the embedded watermark is retrieved. Then, in step S1800, the data containing the selected portion of the image with the retrieved watermarks is normalized and stored into the memory for later visualization. In step S1900 the control routine determines if the entire image has been selected and analyzed. If not, control jumps back to step S1400. Otherwise, if the entire image has been analyzed, control continues to step S2000. In step S2000, the control routine stops.

The resolution of the input device does not need to match the resolution of the input printed copy image. Importantly, the resolution of the input device can be lower than the resolution of the printed copy image. As discussed below, the system and method of this invention are capable of successfully detecting watermarks from images that were printed at 400 dpi and scanned at 300 dpi. Furthermore, if the resolution of the input device used to scan the printed copy image increases, the signal-to-noise ratio increases and the contrast of the retrieval watermark in the resulting image is enhanced.

Due to the periodicity of the halftoning process, the global autocorrelation of a halftone image determined in step S1200 presents peak values at certain positions. If the image has remained in unaltered digital format since the watermark embedding process, these autocorrelation peaks are located exactly as a two dimensional comb function. For example, the halftone image 100 shown in FIG. 1 was generated by a stochastic halftone screen with the periodicity of 90 pixels in both x and y direction. Therefore, the autocorrelation peaks of image 100 are shown as a two dimensional comb function with 90 pixel separation in both the x and y directions. To determine the existence of this comb function and its periodicity and orientation, autocorrelation peaks other than the one at (0, 0) position are searched for. For the example image shown in FIG. 1, two autocorrelation peaks at (90, 0) and (−90, 0) are located on the horizontal axis and two peaks at (0, 90) and (0, −90) on the vertical axis.

However, if the halftone image has been converted into hardcopy format, i.e., is moved out of the digital realm, the printing and/or copying process, as well as the scanning process to convert the halftone image back to the digital realm, may introduce unknown scaling, rotation, distortion and noise into the reformed digital image. For example, the halftone image 100 shown in FIG. 1 was printed by a black and white printer at 400 dpi and scanned by a scanner also at 400 dpi. Theoretically, four peaks of the autocorrelation function on the horizontal and the vertical axes should remain at (90, 0), (−90, 0), (0, 90) and (−90, 0) locations. When searching for the actual global autocorrelation, two correlation peaks are located near the horizontal axis at (89, 1) and (−89, 1), and two peaks near the vertical axis at (−1, 90) and (1, 90). Therefore, if the embedded watermarks are assumed to have been generated by a stochastic screen with a horizontal arrangement, as described above, searching for localized correlation peaks by the piecewise autocorrelation determiner 243 can be reduced to searching only around point (89, 1) of each 90×90 pixel portion of the image.

It should be appreciated that this search process can be straightforwardly varied to encompass embedded watermarks that have a vertical orientation or even a plurality of orientations. Furthermore, the system and method of this invention encompasses retrieving digital watermarks from color images. By using the same halftone screen for color prints, i.e., for each color separation layer of a CMYK image, detecting the embedded watermarks in a color image is performed identically to the process outlined above. However, if a different halftone screen is used for each color separation layer, the retrieval process must be performed independently on each color separation layer.

The moving window used in step S1300 should be large enough to cover an area containing a portion of two adjacent correlated halftone patterns. For example, for the image 100 shown in FIG. 1, the moving window could vary from as small as 100×20 pixels to as large as 256×256 pixels. Larger moving windows provide a higher signal-to-noise ratio and faster speed in the localized piecewise autocorrelation determination performed in step S1500. In contrast, smaller moving windows provide better results when the input image suffers from severe distortion. However, smaller windows slow the piecewise localized autocorrelation determination. In processing the example image 100 illustrated in FIG. 1, with the printer and scanner resolutions both at 400 dpi, an arbitrary moving window size of 100×50 was selected. However, it should be appreciated that the "moving" window can be at least as large as the full image from which the watermarks are to be retrieved, with the aforementioned drawbacks.

It should be appreciated that, in step S1600, the generation of a shifted image can be accomplished using a convention method. However, in the preferred embodiment, to generate the shifted image, for each separate window positioned at a horizontal position i and a vertical position j, the shifted image for that window is subtracted from the input image for that window to retrieve the watermarks. That is:

$$G_{res}(i,j) = G_{Shift}(i,j) - G(i,j),$$

where:

$G_{res}(i,j)$ is the resulting image data for the location (i,j) in which the watermarks are visible;

$G_{shift}(i,j)$ is the shifted image data at original location (i, j); and $G(i,j)$ is the original image data at original location (i, j).

Figure 8:
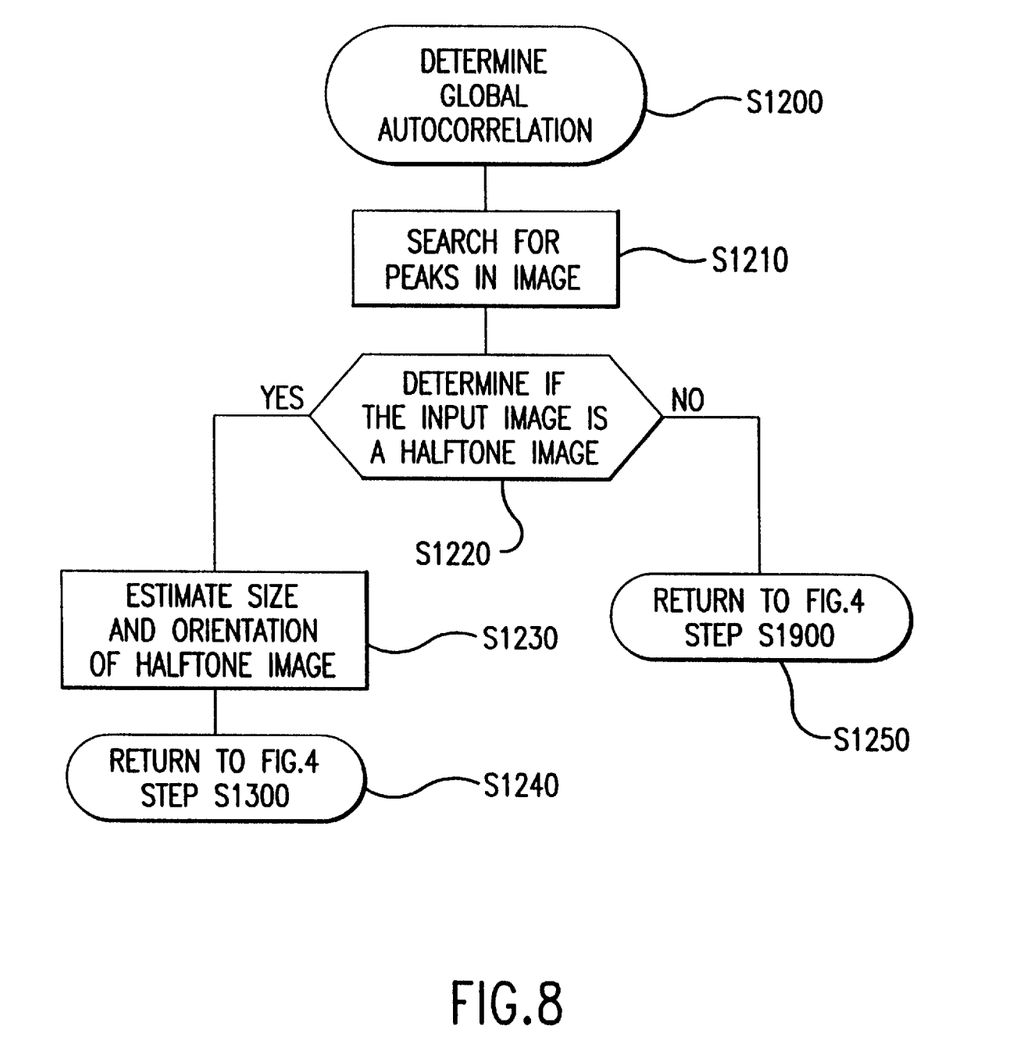
FIG. 8 is a flowchart outlining in greater detail the global autocorrelation determination step of FIG. 7.

FIG. 8 outlines in greater detail one method for performing the global autocorrelation determination of step S1200 of FIG. 7 according to the invention. Control commences in step S1200, and continues to step S1210. In step S1210, the global peaks in the input image are searched for.

Next, in step S1220, a determination of whether the image is a halftone is made by searching for local relative peaks other than the DC term. If the image is a halftone, at least two peaks of its autocorrelation, symmetric about the origin (0, 0) of the halftone source, should stand fairly above the average value of their neighborhoods in relation to a measure of the absolute value. If the image is not a halftone, control jumps to step S1250, where control is returned to step S1900. If, in step S1220, the image is determined to be a halftone image, control continues to step S1230. In step S1230, the size and orientation of the halftone image is estimated. Next, in step S1240, control is returned to step S1300.

Figure 9:
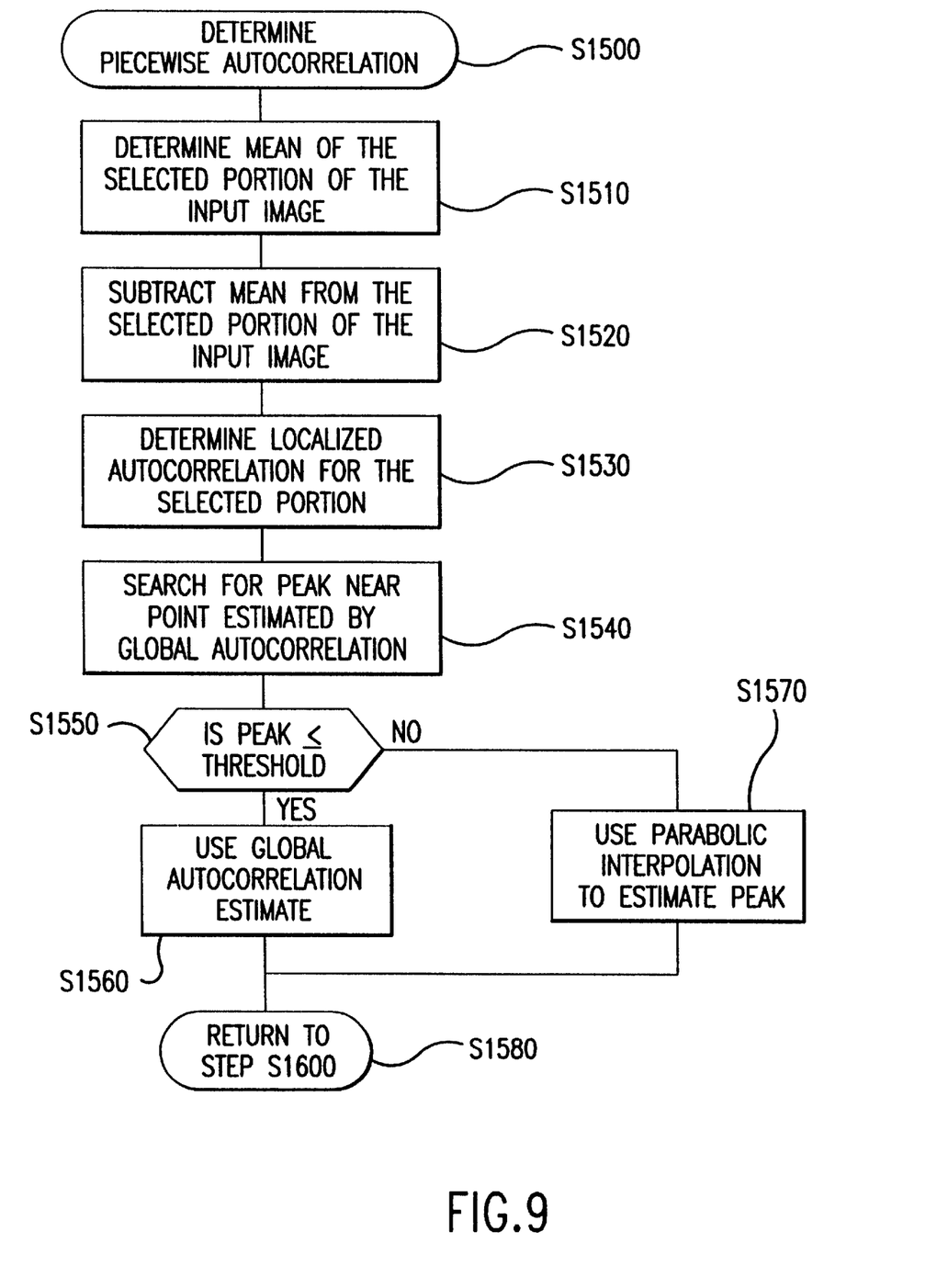
FIG. 9 is a flowchart outlining in greater detail the piecewise autocorrelation determination step of FIG. 7.

FIG. 9 outlines in greater detail one method for determining the piecewise autocorrelation for the image of step S1500 of FIG. 4 according to this invention. The moving window was selected in step S1300. The current moving-window-sized portion of the image was selected in step S1400. In particular, in step S1400, the selected window is positioned at an initial location (i, j) within the input image and the input image for the current position of the moving window is cropped to the size of the moving window. Thus, the piecewise autocorrelation commences in step S1500, and proceeds to step S1510. In step S1510, the mean of the cropped image for the current position of the moving window is determined. Then, in step S1520, the mean for the current position of the moving window is subtracted from the cropped input image. Next, in step S1530, the autocorrelation of the cropped and mean-subtracted image is determined. Control then continues to step S1540.

In step S1540, a local autocorrelation peak is searched for near the point estimated by the global autocorrelation determination of step S1200. Then, in step S1550, a threshold for the noise level is compared to determine the position of the local relative peak. The threshold for the noise level is approximately 2.0σ, where σ is the root mean square of the autocorrelation calculated for the current window position excluding autocorrelation at (0, 0) and its immediate neighbors. If the peak value is lower than the threshold, control continues to step S1560. Otherwise, if the peak is greater than the threshold, control jumps to step S1570.

In step S1560, the global autocorrelation estimate from step S1200 is used for the current window position for later processing in step S1600. In step S1570, parabolic interpolation is used to estimate the peak. Control then continues to step S1580. In step S1580, control returns to step S1600 of FIG. 7.

In step S1570, parabolic interpolation is used to estimate an accurate maximal autocorrelation position. Preferably, the parabolic interpolation is defined by:

$$x_{acc}=i_p+0.5\cdot[f(i_p+1,j_p)-f(i_p-1,j_p)]/[2\cdot f(i_p,j_p)-f(i_p+1,j_p)-f(i_p-1,j_p)],$$

$$y_{acc}=j_p+0.5\cdot[f(i_p,j_p+1)-f(i_p,j_p-1)]/[2\cdot f(i_p,j_p)-f(i_p,j_p+1)-f(i_p,j_p-1)],$$

where:

$f(i, j)$ is the calculated autocorrelation function for the current portion $(i, j)$, $(i_n, j_n)$ is the peak position within the current portion, and $(x_{acc}, y_{acc})$ is an estimation of an accurate maximal position within the current portion. However, it should be appreciated that there are other methods of performing this interpolation.

In step S1600, with the estimated peak position by step S1500, the shifted version of the scanned image can be generated by:

$$G_{Shift}(i,j)=w_1\cdot G(i+int(x_{acc}),j+int(y_{acc}))+w_2\cdot G(i+int(x_{acc})+1, j+int(y_{acc}))+w_3\cdot G(i+int(x_{acc}), j+int(y_{acc})+1)+$$

$$w_4\cdot G(i+int(x_{acc})+1, j+int(y_{acc})+1),$$

where:

$w_1\{1.0-[x_{acc}-int(x_{acc})]\}\cdot\{1+[y_{acc}-int(y_{acc})]\}$, $w_2=[x_{acc}-int(x_{acc})]\cdot\{1-[y_{acc}-int(y_{acc})]\}$, $w_3=\{1.0-[x_{acc}-int(x_{acc})]\}\cdot[y_{acc}-int(y_{acc})]$, $w_4=[x_{acc}-int(x_{acc})]\cdot[y_{acc}-int(y_{acc})]$ and $G(i, j)$ is the input image.

The shift values $x_{acc}$ and $y_{acc}$ are determined from the piecewise autocorrelation determination for the corresponding current portion, where both $(i, j)$ and $(i+x_{acc}, j+y_{acc})$ are covered.

Figure 10:
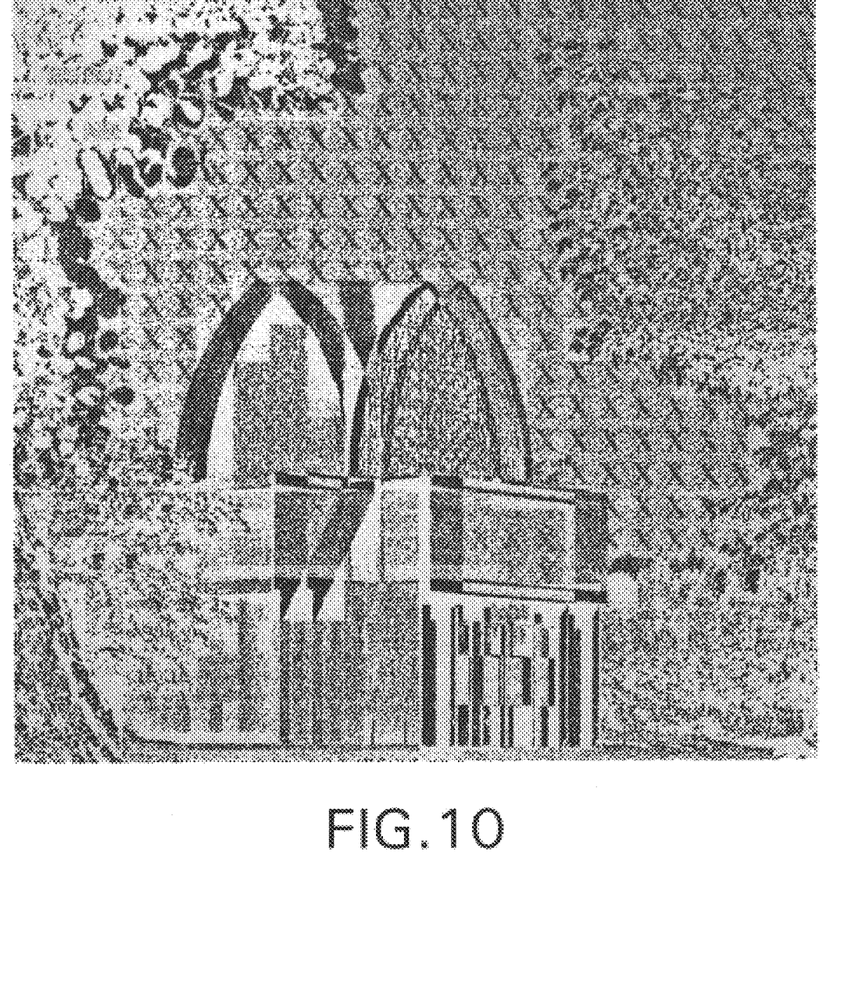
FIG. 10 shows retrieved digital watermarks using a first scanning resolution.
Figure 11:
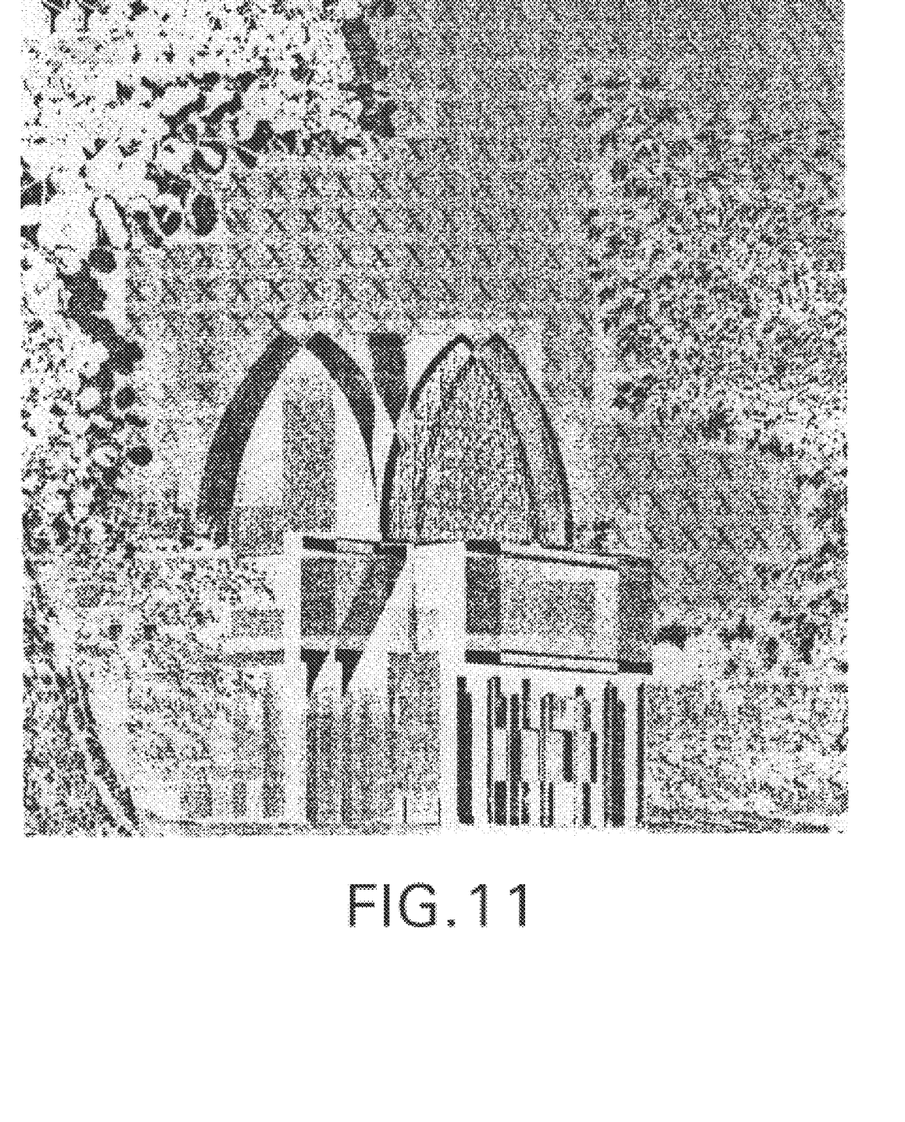
FIG. 11 shows retrieved digital watermarks using a coarse scanning resolution.

FIGS. 10 and 11 show examples of embedded watermark retrieval as outlined above in FIGS. 5–7. The above-outlined method was conducted on a halftone image, printed by a 400 dpi printer and scanned in both 300 and 400 dpi modes. FIG. 10 illustrates the image 500 resulting from performing the method of this invention on a 400 dpi printed image that was scanned at 400 dpi. The recovered watermarks 510 are clearly visible. FIG. 11 illustrates the image 600 resulting from performing the method of this invention on a 400 dpi printed image that was scanned at 300 dpi. The recovered watermarks 610 are also clearly visible.

Figure 12:
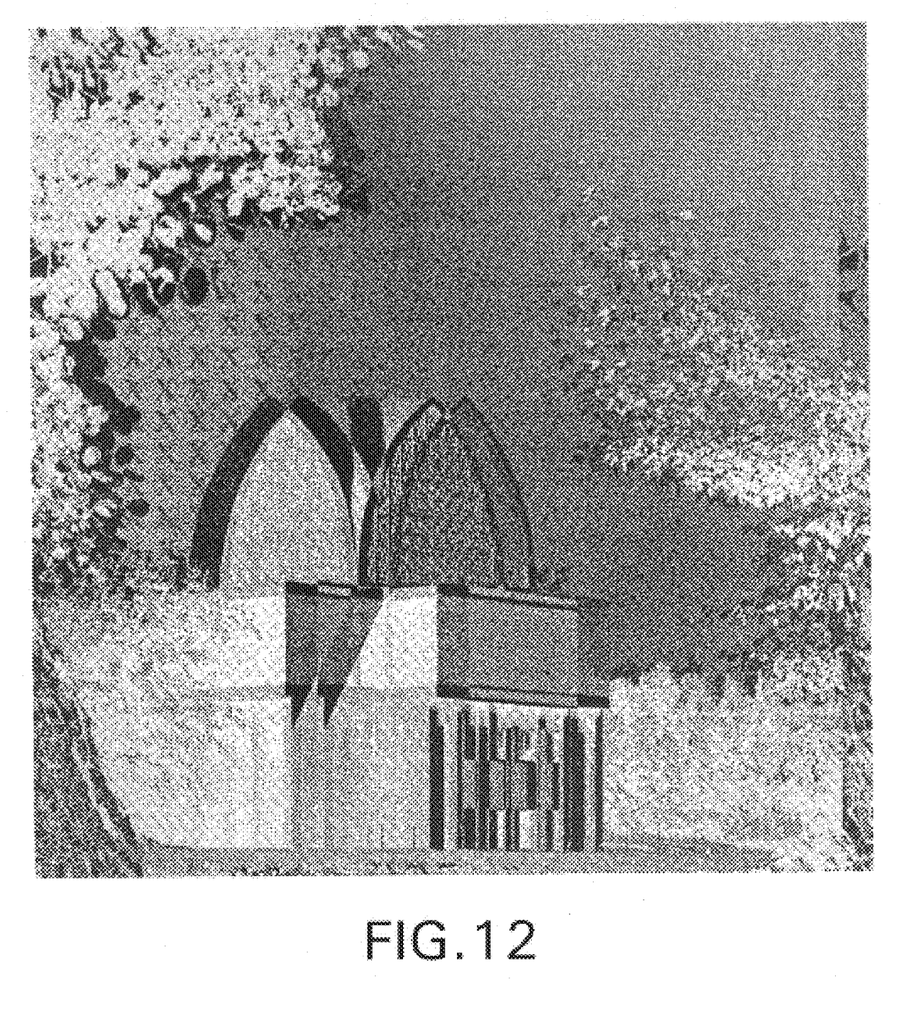
FIG. 12 shows watermarks retrieved from the image shown on FIG. 1 using a constant shift.

By comparison, as shown in FIG. 12, efforts to retrieve watermarks by applying a constant shift determined by the global autocorrelation to the entire image 100 resulted in an image 700, which was both printed and scanned at 400 dpi. Note the X logo watermarks 710 are only clearly visible on the left hand portion of the image shown in FIG. 12.

As shown in FIG. 3, the watermark extraction device 200 is preferably implemented on a programmed general purpose computer. However, the watermark extraction device 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 5–7, can be used to implement the watermark extraction device 200.

It is, therefore, apparent that there has been provided, in accordance with the present invention, a method and apparatus for detecting and retrieving embedded digital watermarks from halftone prints. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for recovering an embedded invisible digital watermark from an image, comprising:

determining a global autocorrelation of the image;

selecting a window having a determined size;

selecting a current portion of the image corresponding to the size of the window;

determining a piecewise localized autocorrelation of the image for the current portion;

generating a shifted image for the current portion;

retrieving the embedded watermarks for the current portion;

repeating the portion selecting, determining, generating and retrieving steps for a new current portion until the entire image has been analyzed; and generating a new image containing the retrieved watermarks.

2. The method of claim 1, wherein determining the global autocorrelation comprises:

searching the image for autocorrelation peaks;

determining if the image is a halftone; and estimating a size and orientation of the halftone.

3. The method of claim 1, wherein selecting the window comprises determining the window size, the determined window size being large enough to ensure a portion of two adjacent correlated halftone patterns is contained within the window.

4. The method of claim 1, wherein selecting the portion of the image corresponding to the size of the window comprises cropping the image at the current position to the size of the window.

5. The method of claim 1, wherein determining the piecewise localized autocorrelation for the current portion comprises:

determining a mean of the current portion;

subtracting the mean from the current portion;

determining a local autocorrelation of the current portion;

locating a local peak of the current portion near a point estimated by the global autocorrelation; and determining a maximal autocorrelation position for the current portion.

6. The method of claim 5, wherein determining the maximal correlation comprises using either the global autocorrelation or a parabolic interpolation to estimate the local peak for the current portion.

7. The method of claim 6, wherein the parabolic interpolation comprises:

$$x_{acc}=i_p+0.5\cdot[f(i_p+1,j_p)-f(i_p-1,j_p)]/[2\cdot f(i_p,j_p)-f(i_p+1,j_p)-f(i_p-1,j_p)],$$

$$y_{acc}=j_p+0.5\cdot[f(i_p,j_p+1)-f(i_p,j_p-1)]/[2\cdot f(i_p,j_p)-f(i_p,j_p+1)-f(i_p,j_p-1)],$$

where:

$f(i, j)$ is a calculated autocorrelation function for the current position $(i, j)$;

$(i_n, j_n)$ is a peak position within the current portion; and ($x_{acc}$, $y_{acc}$) is an estimation of an accurate maximal position within the current portion.

8. The method of claim 1, wherein generating the shifted image comprises:

$$G_{Shift}(i, j) = w_1 \cdot G(i+int(x_{acc}), j+int(y_{acc})) + w_2 \cdot G(i+int(x_{acc})+1, j+int(y_{acc})) + w_3 \cdot G(i+int(x_{acc}), j+int(y_{acc})+1) + w_4 \cdot G(i+int(x_{acc})+1, j+int(y_{acc})+1),$$

where:
$w_1 \{1.0-[x_{acc}-int(x_{acc})]\} \cdot \{1+[y_{acc}-int(y_{acc})]\}$,
$w_2 = [x_{acc}-int(x_{acc})] \cdot \{1-[y_{acc}-int(y_{acc})]\}$,
$w_3 = \{1.0-[x_{acc}-int(x_{acc})]\} \cdot [y_{acc}-int(y_{acc})]$,
$w_4 = [x_{acc}-int(x_{acc})] \cdot [y_{acc}-int(y_{acc})]$ and
$G(i, j)$ is the input image; and
shift values $x_{acc}$ and $y_{acc}$ are determined from the piecewise autocorrelation determination for the corresponding current portion, where both $(i, j)$ and $(i+x_{acc}, j+y_{acc})$ are covered.

9. The method of claim 1, further comprising inputting the image.

10. A recovery system that retrieves embedded invisible digital watermarks from an image comprising:
input means for inputting the image;
global autocorrelation means for determining a global autocorrelation for the image;
piecewise autocorrelation means for determining a piecewise autocorrelation for each of a plurality of portions of the image;
shifting means for generating a shifted version for each of the plurality of portions of the image based on the piecewise local autocorrelation;
new image generation means for generating, based on the plurality of portions of the corresponding shifted versions, a new image containing retrieved watermarks; and
output means for displaying the new image containing the retrieved watermark.

11. The system of claim 10, wherein the global autocorrelation means further comprises:
searching means for searching the image for peaks;
determining means for determining if the image is a halftone; and
estimating means for estimating a size and orientation of the halftone.

12. The system of claim 10, wherein the piecewise autocorrelation means further comprises:
positioning means for moving a window across the image;
selecting means for cropping the image based on a position of the window to form the plurality of portions;
determining means for determining, for each portion, a mean of that portion;
subtracting means for subtracting, for each portion, the determined mean for that portion from that portion;
determining means for determining, for each portion, a localized autocorrelation for that portion; and
searching means for searching for, for each portion, an autocorrelation peak near a point estimated by the global autocorrelation for that portion.

13. The system of claim 12, further comprising decision means for deciding, for each portion, whether to use the global autocorrelation or a parabolic interpolation to estimate a localized autocorrelation peak.

14. The method of claim 13, wherein the parabolic interpolation comprises:

$$x_{acc} = i_p + 0.5 \cdot [f(i_p+1, j_p) - f(i_p-1, j_p)] / [2 \cdot f(i_p, j_p) - f(i_p+1, j_p) - f(i_p-1, j_p)],$$

$$y_{acc} = j_p + 0.5 \cdot [f(i_p, j_p+1) - f(i_p, j_p-1)] / [2 \cdot f(i_p, j_p) - f(i_p, j_p+1) - f(i_p, j_p-1)],$$

where:
$f(i, j)$ is a calculated autocorrelation function for the current position $(i, j)$;
$(i_n, j_n)$ is a peak position within the current portion; and
($x_{acc}$, $y_{acc}$) is an estimation of an accurate maximal position within the current portion.

15. The method of claim 10, wherein generating the shifted image comprises:

$$G_{Shift}(i, j) = w_1 \cdot G(i+int(x_{acc}), j+int(y_{acc})) + w_2 \cdot G(i+int(x_{acc})+1, j+int(y_{acc})) + w_3 \cdot G(i+int(x_{acc}), j+int(y_{acc})+1) + w_4 \cdot G(i+int(x_{acc})+1, j+int(y_{acc})+1),$$

where:
$w_1 \{1.0-[x_{acc}-int(x_{acc})]\} \cdot \{1+[y_{acc}-int(y_{acc})]\}$,
$w_2 = [x_{acc}-int(x_{acc})] \cdot \{1-[y_{acc}-int(y_{acc})]\}$,
$w_3 = \{1.0-[x_{acc}-int(x_{acc})]\} \cdot [y_{acc}-int(y_{acc})]$,
$w_4 = [x_{acc}-int(x_{acc})] \cdot [y_{acc}-int(y_{acc})]$ and
$G(i, j)$ is the input image; and
shift values $x_{acc}$ and $y_{acc}$ are determined by the result of the piecewise autocorrelation calculation for a corresponding current portion, where both $(i, j)$ and $(i+x_{acc}, j+y_{acc})$ are covered.

16. A system that extracts a digital watermark from an image based on a global and piecewise autocorrelation comprising a controller, a memory and an autocorrelator, wherein the autocorrelator comprises:
an global autocorrelator that determines a global autocorrelation of the image;
a moving window selector that selects a moving window;
a piecewise autocorrelator that determines a piecewise local autocorrelation of the image for each of a plurality of portions of the image;
a shifted image generator that generates a shifted version for each portion based on the corresponding piecewise autocorrelation;
a watermark retriever that retrieves a watermark for each portion based on that portion and the corresponding shifted image; and
an image visualizer that generates, based on the retrieved watermarks, a new image containing the retrieved visible watermarks.

17. The system of claim 16, wherein the global autocorrelator comprises:
a peak determiner that searches the image for peaks;
a halftone determiner that determines if the image is a halftone; and
a halftone estimator that estimates a size and orientation of the halftone.

18. The system of claim 17, wherein the autocorrelator comprises:
a moving window positioner that searches the image for peaks;
an image cropper that crops the image, based on the position of the moving window, to form the plurality of portions;

a mean determiner that determines, for each portion, a mean of that portion;

a mean subtractor that subtracts, for each portion, the mean for that portion from that portion;

a local autocorrelation determiner that determines, for each portion, a local autocorrelation for that portion; and a correlation determiner that determines, for each portion, a maximal autocorrelation position of that portion.

19. The system of claim 18, wherein the correlation determiner determines the maximal correlation using either the global autocorrelation or a parabolic interpolation to estimate a localized autocorrelation peak.

20. The method of claim 19, wherein the parabolic interpolation comprises:

$$x_{acc}=i_p+0.5\cdot[f(i_p+1,j_p)-f(i_p-1,j_p)]/[2\cdot f(i_p,j_p)-f(i_p+1,j_p)-f(i_p-1,j_p)],$$

$$y_{acc}=j_p+0.5\cdot[f(i_p,j_p+1)-f(i_p,j_p-1)]/[2\cdot f(i_p,j_p)-f(i_p,j_p+1)-f(i_p,j_p-1)],$$

where:
$f(i, j)$ is a calculated autocorrelation function for the current position $(i, j)$;
$(i_p, j_p)$ is a peak position within the current portion; and
$(x_{acc}, y_{acc})$ is an estimation of an accurate maximal position within the current portion.

21. The method of claim 16, wherein generating the shifted image comprises:

$$G_{Shift}(i,j)=w_1\cdot G(i+int(x_{acc}),j+int(y_{acc}))+w_2\cdot G(i+int(x_{acc})+1,j+int(y_{acc}))+w_3\cdot G(i+int(x_{acc}),j+int(y_{acc})+1)+$$

$$w_4\cdot G(i+int(x_{acc})+1,j+int(y_{acc})+1),$$

where:
$w_1\{1.0-[x_{acc}-int(x_{acc})]\}\cdot\{1+[y_{acc}-int(y_{acc})]\}$,
$w_2=[x_{acc}-int(x_{acc})]\cdot\{1-[y_{acc}-int(y_{acc})]\}$,
$w_3=\{1.0-[x_{acc}-int(x_{acc})]\}\cdot[y_{acc}-int(y_{acc})]$,
$w_4=[x_{acc}-int(x_{acc})][y_{acc}-int(y_{acc})]$ and
$G(i, j)$ is the input image; and
shift values $x_{acc}$ and $y_{acc}$ are determined from the piecewise autocorrelation determination for the corresponding current portion, where both $(i, j)$ and $(i+x_{acc}, j+y_{acc})$ are covered.

22. The system of claim 16, further comprising:
an input/output interface;
an image input device; and
an image output device.

23. The system of claim 22, wherein the image input device is one of a digitizer, a scanner, a digital photocopier, a digital camera, or a video camera.

24. The system of claim 22, wherein the image output device is one of a printer, a monitor, a plotter, a digital photocopier, or video projector.

25. The system of claim 22, wherein each of the image input device and the image output device is one of a server of a local area network, a node of a local area network, a node of a wide area network, a node of an intranet, a node of the Internet, and a node of a distributed network.

26. The method of claim 1, further including generating the image from which the watermark is to be recovered using an input interface and an image input device and generating the new image using an image output interface and an image output device.

27. The method of claim 26, wherein the step of generating the image includes using one of a digitizer, a scanner, a digital photocopier, a digital camera, or a video camera.

28. The method of claim 26, wherein the step of generating the new image includes using one of a printer, a monitor, a plotter, a digitally photocopier or video projector.

29. The method of claim 26, wherein using an image input image output device or an input/output interface includes using one of a server of a local network, a node of a local area network, a node of a wide area network, a node of an intranet, a node of the Internet, and a node of a distributed network.

30. The system of claim 10, further comprising
an input/output interface means;
an image input means; and
an image output means.

31. The system of claim 30, wherein the image input means is one of a digitizing means, a scanning means, a digital photocopying means, a digital camera means, or a video camera means.

32. The system of claim 30, wherein the image output means is one of a printing means, a monitoring means, a plotting means, a digital photocopying means, or a video projecting means.

33. The system of claim 30, wherein each of the image input means and the image output means is one of a server for a local area network, a node of a local area network, a node of a wide area network, a node of an intranet, a node of the Internet, and a node of a distributed network.

* * * * *